United States Patent [19]

Marks et al.

[11] Patent Number: 5,715,303

[45] Date of Patent: Feb. 3, 1998

[54] METHOD AND SYSTEM FOR CONFIGURING A TELECOMMUNICATION SWITCH AND IDENTIFYING A RECORD GENERATED BY SAME

[75] Inventors: Martin R. Marks; Michael S. Crum, both of Phoenix, Ariz.

[73] Assignee: U S West Communications, Inc., Denver, Colo.

[21] Appl. No.: 744,679

[22] Filed: Nov. 6, 1996

Related U.S. Application Data

[63] Continuation of Ser. No. 67,659, May 26, 1993, abandoned.

[51] Int. Cl.$^6$ .................................................. H04M 15/00
[52] U.S. Cl. ................................................................ 379/113
[58] Field of Search ............................ 379/112, 113, 379/114, 115, 118, 120, 121, 124, 125, 126, 127, 133, 134

[56] References Cited

U.S. PATENT DOCUMENTS

| | | | |
|---|---|---|---|
| 5,012,511 | 4/1991 | Homle et al. | 379/211 |
| 5,146,490 | 9/1992 | Beckman | 379/113 |
| 5,222,125 | 6/1993 | Creswell et al. | 379/67 |
| 5,381,467 | 1/1995 | Rosinski et al. | 379/114 |
| 5,392,344 | 2/1995 | Ash et al. | 379/112 |

OTHER PUBLICATIONS

AT&T Communications "Network Communications, applications & services" Jun. 1994, pp. 13–15.

*Primary Examiner*—Stephen Chin
*Assistant Examiner*—Kevin Kim
*Attorney, Agent, or Firm*—Brooks & Kushman P.C.

[57] ABSTRACT

A method and system is disclosed for configuring a telecommunication switch which controls a telecommunication line. The telecommunication switch is programmed to create a usage record for each outgoing call. The method includes the step of creating in the switch at least one service record for identifying optional features associated with the telecommunication line. The at least one service record includes a line class code field and a service feature code field. The method also includes the steps of receiving a signal representing line class code data enabling the telecommunication switch to create a usage record for each incoming call, and storing the line class code data in the line class code field. The method finally includes the steps of receiving a signal representing service feature code data for identifying usage records, and storing the service feature code data in the service feature code field. The telecommunication switch configured according to the present invention creates usage records for reporting both incoming and outgoing calls associated with the telecommunication line.

10 Claims, 3 Drawing Sheets

METHOD AND SYSTEM FOR CONFIGURING A TELECOMMUNICATION SWITCH AND IDENTIFYING A RECORD GENERATED BY SAME

This is a continuation of application Ser. No. 08/067,659, filed on May 26, 1993, now abandoned.

TECHNICAL FIELD

This invention relates generally to telecommunication methods and systems. More specifically, this invention relates to methods and systems for configuring telecommunication switches for measuring and reporting usage of telecommunication lines. This invention further relates to methods and systems for identifying a record generated by a telecommunication switch for measuring and reporting usage of telecommunication line.

BACKGROUND ART

Telecommunication is commonly accomplished through an intelligent network incorporating a switching system, a signalling network, a centralized database and an operations support system. The switching system includes a number of telecommunication switches, and each switch controls a number of individual telecommunication lines.

One function performed by a switch is to monitor and record usage of each line under its control. A switch that controls an Inward Wide Area Telephone Service ("INWATS") line records usage of the line based on incoming calls, and a switch that controls a Plain Old Telephone Service ("POTS") line records usage of the line based on outgoing calls.

A POTS line leased for business use is referred to as a single flat-rated business line ("1FB"). The lease rates charged by telecommunication service providers for 1FBs are based on the average usage of all 1FBs.

The rates to lease a 1FB are typically based on the cost to provide the service. A user is charged a flat rate for access to the line. In addition to the flat rate, the user is charged a fee for each special feature provided for the line. Activation and deactivation fees are also charged by telecommunication providers to cover the cost of reconfiguring the switch.

Like other products and services, the demand for 1FBs is directly affected by their cost in relation to their benefits. It has been determined that the elements of the current 1FB lease rate schedules deter a number of businesses from leasing 1FBs. In particular, the elements of the 1FB lease rates are disadvantageous for businesses with fluctuating telecommunication traffic and businesses requiring a dedicated telecommunication line for low-volume use.

Many businesses experience predictable fluctuations in their telecommunication traffic. A business can experience seasonal, monthly, weekly and even daily peaks and valleys in its telecommunication usage. Furthermore, the traffic may be predominantly incoming or outgoing calls depending on the nature of the business.

In order to provide optimum service to its customers, a business with fluctuating telecommunication volume generally has two options regarding maintaining telecommunication lines. It may maintain only the number of lines needed to accommodate a predicted level of telecommunication traffic, or it may lease enough 1FBs to accommodate the telephone traffic during its peak period.

In order to maintain only the number of 1FBs needed to accommodate the predicted level of telecommunication traffic, the business must have additional lines connected during peak periods and must have unnecessary lines disconnected during slow periods. Unfortunately, in some cases, the activation and deactivation fees cost as much as it would to continue paying for the leased line.

Likewise, if the business leases enough 1FBs to accommodate the telecommunication traffic during its peak period, the business will experience excess capacity during low traffic periods. Unfortunately, the business is charged the flat rate on the 1FBs which are not being used.

Other businesses require a dedicated line for a low volume of calls. Examples include businesses having rarely used facsimile machines, PC MODEMs or credit card verification units. A business leasing a 1FB for such purposes will pay a flat monthly rate even if the line is not used.

A need therefore exists for a method and system for configuring a telecommunication switch to provide a telecommunication line which can be leased based on alternative criteria.

A need also exists for a method and system for configuring a telecommunication switch to provide an inexpensive alternative telecommunication line which can accommodate fluctuating calling volume.

A need further exists for a method and system for configuring a telecommunication switch to provide an inexpensive alternative telecommunication line which can accommodate low volume users.

SUMMARY OF THE INVENTION

The present invention described and disclosed herein comprises a method and system for configuring a telecommunication switch controlling a telecommunication line.

It is an object of the present invention to provide a method and system for configuring a telecommunication switch to generate usage records for incoming and outgoing calls associated with a telecommunication line controlled by the telecommunication switch wherein the usage records can be used by a computerized billing system.

It is another object of the present invention to provide a method and system for identifying usage records generated by a telecommunication switch controlling a two way measured telecommunication line wherein the identified usage records represent incoming calls associated with the telecommunication line.

In carrying out the above objects and other objects of the present invention, a method is provided for configuring a telecommunication switch controlling a telecommunication line. The telecommunication switch of the present invention includes control logic to create a usage record for each outgoing call associated with the telecommunication line.

The method of the present invention includes the step of creating in the telecommunication switch at least one service record for identifying optional features associated with the telecommunication line. A service record as used herein is broader than the term as used conventionally and includes any record used to identify features and characteristics of associated telecommunication lines. The service records of the present invention must include a line class code ("LCC") field and a service feature code ("SFC") Field.

The method also includes the step of receiving a signal representing line class code data. The line class code data of the present invention enables the telecommunication switch to create a usage record for each incoming call as well as each outgoing call. The method further includes the step of storing the line class code data in the line class code field.

In addition, the method includes the step of receiving a signal representing service feature code data. One use for the service feature code data is for uniquely identifying usage records for reporting incoming calls associated with the telecommunication line. The method also includes the step of storing the service feature code data in the service feature code field.

In further carrying out the above objects and other objects of the present invention, a second method is provided for identifying a usage record in a usage database. The usage record identified by the method represents an incoming call associated with a two way measured telecommunication line.

The method includes the step of comparing call type data to a predetermined call type value. The method further includes the step of determining if the call type data is equivalent to the predetermined call type value. This determination indicates that the usage record represents incoming call usage. In the preferred embodiment, the usage record must have a call type value of 8.

In addition, the method includes the step of comparing service feature code data to a predefined service feature code value. The method further includes the step of determining if the service feature code data is equivalent to the predefined service feature code value. This determination indicates that the incoming call usage record is associated with a two way measured telecommunication line.

In further carrying out the above objects and other objects of the present invention, systems are also provided for carrying out the steps of the above described methods.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
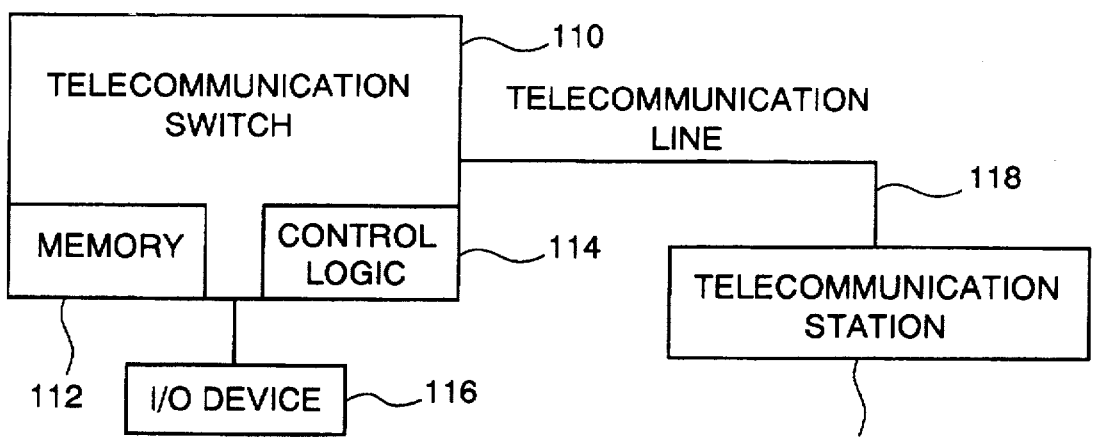
FIG. 1 is a functional block diagram of the system for configuring a telecommunication switch to generate usage records for incoming and outgoing calls associated with a telecommunication line controlled by the telecommunication switch in accordance with the present invention.
Figure 1A:
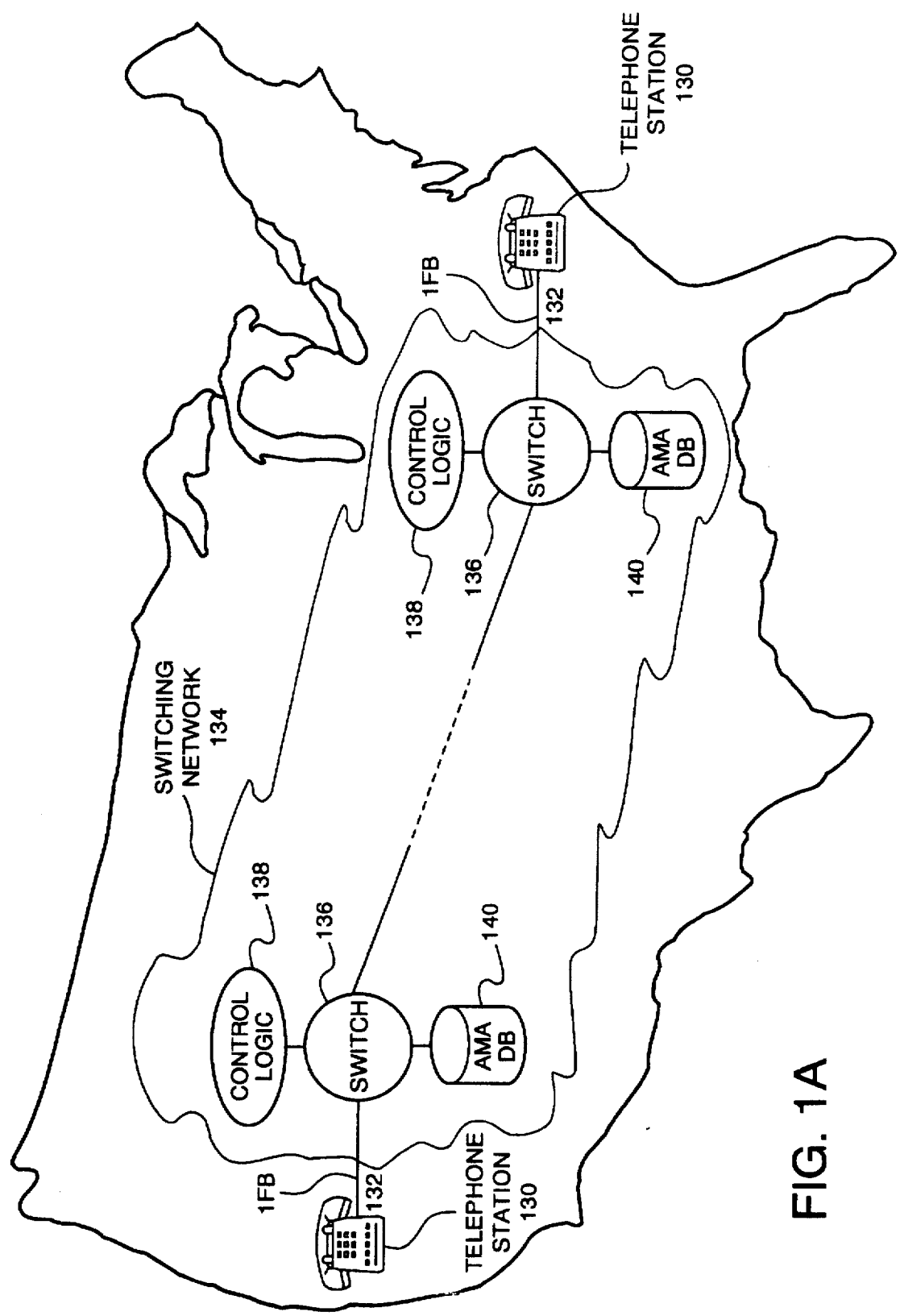
FIG. 1a is a diagram generally illustrating the environment in which the present invention may be implemented.

Referring to the drawings, FIG. 1a generally illustrates the environment in which the present invention may be implemented. Telephone station 130 is connected via 1FB 132 to a switching network 134. The switching network 134 includes a number of telecommunication switches 136. The switching network 134 routes calls between the switches 136 to connect telephone stations 130.

Switch 136 has access to an Automatic Message Accounting ("AMA") database 140 containing records indicating the usage of lines controlled by the switch 136. The AMA database 140 may be local to the switch 136 or centralized, making it accessible to any switch 136 in the switching network 134. The switch 136 is controlled by control logic 138. All telephone calls using telephone station 130, whether incoming or outgoing, are routed through switch 136.

Referring now to FIG. 1, this diagram illustrates the elements of the system for configuring a telecommunication switch in accordance with the present invention. The system requires a telecommunication switch 110 which controls a telecommunication line 118.

The telecommunication switch 110 includes memory 112. One function of the memory 112 is to retain a line class record which defines features supported by the telecommunication switch 110 for the telecommunication line 118. A second function of the memory is to retain a Simulated Facility Group ("SFG") record assigned to the telecommunication line. A third function of the memory 112 is to retain AMA records. The AMA records created by the telecommunication switch 110 report the use of the telecommunication line 118.

The telecommunication switch 110 further includes control logic 114. The control logic 114 monitors the usage of telecommunication line 118 and creates an AMA record for each outgoing call associated with the telecommunication line 118. Based on the defined features of the telecommunication line 118, the control logic 114 also creates an AMA record for each incoming call associated with the telecommunication line 118.

An I/O device 116 is attached to the telecommunication switch 110. The I/O device 116 can be used to configure the telecommunication switch by permitting a user to define the line class record and the SFG record associated with the telecommunication line 118.

FIG. 1 further illustrates that the telecommunication line 118 may be connected a telecommunication station 120. The telecommunication station 120 may be a telephone, facsimile machine, voice message system or any other conventional telecommunication device.

Figure 2:
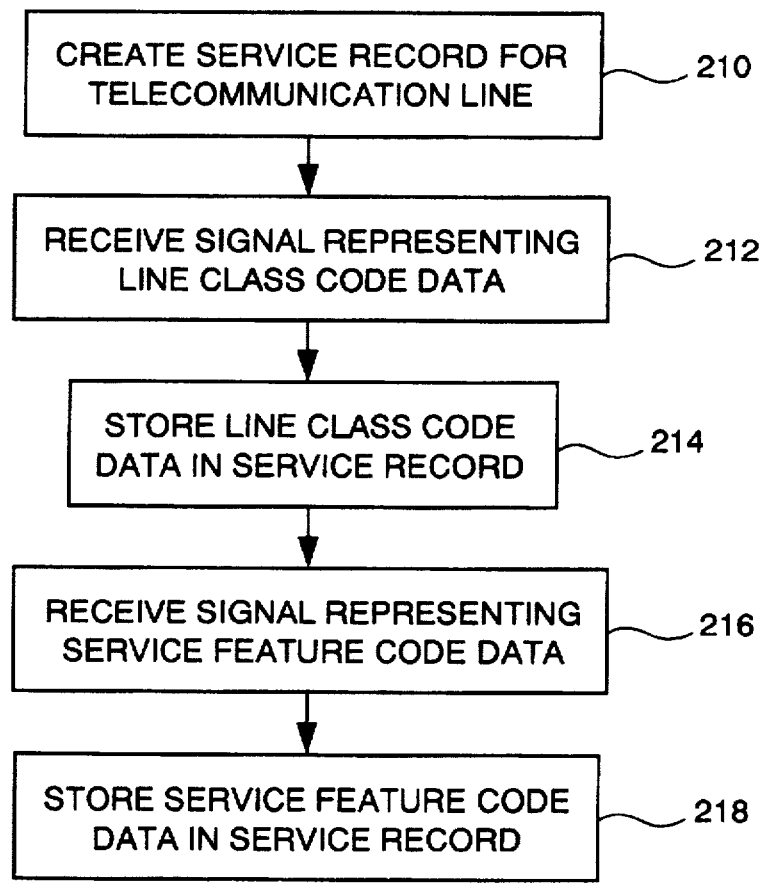
FIG. 2 is a flow chart illustrating the method for configuring a telecommunication switch to generate usage records for incoming and outgoing calls associated with a telecommunication line controlled by the telecommunication switch in accordance with the present invention.

FIG. 2 is a flow chart which illustrates the method for configuring a telecommunication switch in accordance with the present invention. The method results in a telecommunication switch which generates usage records for incoming and outgoing calls associated with the telecommunication line.

At Block 210, at least one service record is created for the telecommunication line. In the preferred embodiment, a line class record and an SFG record are created.

The next step, as shown by block 212, is receiving a signal representing line class code data which defines the telecommunication line and instructs the telecommunication switch to generate an AMA record for each incoming call associated with the line. The line class code data is stored in the service record at block 214.

Block 216 shows the next step of the method. In this step, a signal representing a service feature code is received. The service feature code is used to distinguish between AMA records generated for incoming calls associated with a traditional INWATS telecommunication line and AMA records generated for incoming calls associated with the two way measured telecommunication lines of the present invention. The service feature code is stored in the SFG record at block 218 completing the method of the present invention.

Figure 3:
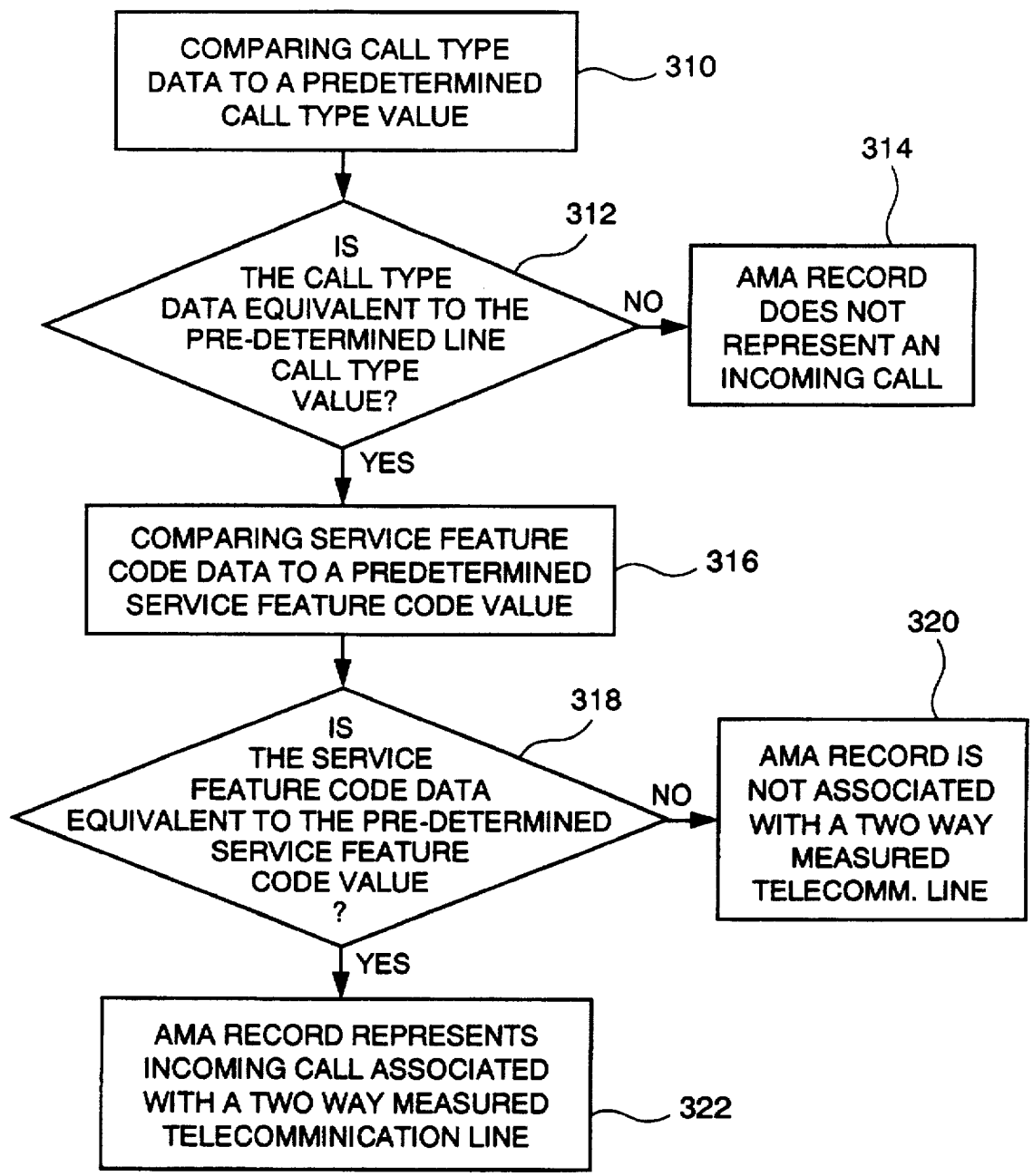
FIG. 3 is a flow chart illustrating the method for identifying a usage record in a usage database, the usage record representing an incoming call associated with a two way measured telecommunication line.

FIG. 3 is a flow chart which illustrates the method for identifying a usage record in a usage database in accordance with the present invention. The usage records of the preferred embodiment are AMA records. The identified AMA record represents an incoming call associated with a two way measured telecommunication line.

At block 310, call type data is compared to a predetermined call type value. The predetermined call type value indicates whether the AMA record represents an incoming or outgoing call. As shown by block 312, if the call type data is not equivalent to the predetermined call type value, control passes to block 314 indicating that the AMA record does not represent an incoming call.

If the AMA record represents an incoming call, control passes to block 316. At block 316, service feature code data is compared to a predetermined service feature code value. The predetermined service feature code value indicates whether the AMA record is associated with a two way measured telecommunication line. As shown at block 318, if the service feature code data is not equivalent to the predetermined service feature code value, control passes to block 320 indicating that the AMA record is not associated with a two way measured telecommunication line.

If the call type data is equivalent to the predetermined call type value and the service feature code data is equivalent to the predetermined service feature code value, the identification is complete. Block 322 shows that the method identifies the AMA record as a record representing an incoming call associated with a two way measured telecommunication line.

The present invention can be implemented on a number of different telecommunication switch types which support AMA records. Three telecommunication switches that are particularly well suited for the method and system of the present invention are the AT&T 1AESS, the AT&T 5ESS and the Northern Telecom DMS-100.

AT&T 1AESS Switches

An AT&T 1AESS telecommunication switch is designed to control analog telecommunication lines. To configure the 1AESS in accordance with the present invention, the Enhanced INWATS Type AMA ("EITA") feature must be used.

The EITA feature generates the correct AMA records for the two way measured line and is supported on 1AE8 and higher generics. To properly configure a switch to control a two way measured line, the EITA feature must be used in conjunction with a service feature code which allows AMA records generated for the two way measured line to be easily distinguished from other INWATS AMA records.

To configure the 1AESS switch, a line record and a simulated facility group record must be created. The line record and the SFG record are used to define the features of the two way measured line. In 1AESS switch types, a one to one correspondence must exist between line records and SFG records.

In essence, a two way measured line controlled by a 1AESS switch must be defined as a measured service line with INWATS billing capabilities. Incoming call billing is provided by setting line class code bit 22 word 1 and defining an SFG record which not only supports INWATS type service, but also allows for AMA record identification. The following forms illustrate the fields which must be defined to implement the present invention on a 1AESS.

| 1306 FORM - LINE CLASS CODE RECORD | |
|---|---|
| KP COLUMN 25–27 = | EZL |
| KP COLUMN 28–29 = | (Chart Number of Local Measured Business Service). |
| KP COLUMN 30–33 = | (Column Number of Local Measured Business Service). |
| KP COLUMN 34–35 = | 04 |
| KP COLUMN 36 37 = | 04 |
| KP COLUMN 38 = | Check Mark for Inwats (Bit 22 word 1) |
| REMARKS = | Stand-By Line |
| 1302A FORM - OFFICE CHARGE RECORD (CENTRAL REGION ONLY) | |
| KP COLUMN 22–23 = | CHARGE INDEX (CENTRAL REGION ONLY) |
| KP COLUMN 29 = | TIMED BULK BILL (CENTRAL REGION ONLY) |
| KP COLUMN 32–33 = | 13 MBI BILLING (CENTRAL REGION ONLY) |
| KP COLUMN 34–35 = | SAME AS LOCAL MEASURED SERVICE (CENTRAL REGION ONLY) |
| REMARKS = | Stand-By Line |

To complete the configuration of a 1AESS switch to support a two way measured line, the SFG record assigned to the two way measured line must have an SFC field identifying the line as a two way measured line. With the exception of the SFC field, the contents of the SFG record for a two way measured line should be exactly the same as that for a regular INWATS line.

Preferably, every SFG record associated with a two way measured line should have the same SFC value. In the preferred embodiment, the SFC field should be filled with "81".

AT&T 5ESS Switches

An AT&T 5ESS telecommunication switch is designed to control digital telecommunication lines. Configuring the 5ESS switch in accordance with the present invention is very similar to configuring the 1AESS. The EITA feature must be used. On the 5ESS switch, the EITA feature is a secured feature which requires a password.

The EITA feature generates the correct AMA records for the two way measured line and is supported on 5E6 and higher generics. To properly configure a switch to control a two way measured line, the EITA feature must be used in conjunction with an SFC which allows AMA records generated for the two way measured line to be easily distinguished from other INWATS AMA records.

To configure the 5ESS switch, a line record and a simulated facility group record must be created. The line record and the SFG record are used to define the features of the two way measured line.

One significant difference between configuring 5ESS switches and 1AESS switches is the relationship between line records and SFG records. Unlike the 1AESS switch types, a one to one correspondence is not required between line records and SFG records assigned to the two way measured line of a 5ESS switch.

To assign an SFG record to a line record of the 5ESS, the line record must have an MC Route Index field which points to the SFG record. This indexing scheme allows multiple line records to point to a single SFG record. In the preferred embodiment, the SFG record assigned to two way measured lines is identified by an SFG number of "310". Therefore, the MC Route Index field must contain "310" to identify the SFG record assigned to two-way measured lines.

In essence, a two way measured line controlled by a 5ESS switch must be defined as a measured service line with INWATS billing capabilities enabled. Incoming call billing is provided by setting terminating treatment and defining an SFG record which not only supports INWATS type service, but also allows for AMA record identification. The following forms illustrate the fields which must be defined to implement the present invention on a 5ESS.

| 5609-3 FORM - LINE CLASS CODE RECORD | |
|---|---|
| Line Class Code = | EZL |
| Rate Area = | (Office local rate area usually 1) |
| Class of Service = | INDIV |
| Terminating Treatment = | INWATS |
| Screening Index = | (use SI for Measured Service) |
| Line Screening = | N |
| DAS = | (Use office local DAS) |
| INSEP = | if used |
| DESEP = | if used |
| Remarks = | Stand-By Line |
| 5609-3 FORM - SIMULATED FACILITY GROUP | |
| SFG Number = | 310 (Standard all 14 States) |
| SFG Type = | Inwats |
| SFG Size = | 1984 |
| ALT SFC = | 810 (Alternate Service Feature Code 800-999) |
| Remarks = | Stand-By Line |
| 5304 FORM - BRCS - MC ROUTE INDEX EXPANSION | |
| MC Route Index | 310 (Standard all 14 States) |
| MC Route Type = | SFG |
| SFG Num = | 310 |
| Remarks = | Stand-By Line |
| 5302-1 FORM (CENTRAL REGION ONLY) - CHARGE INDEX EXPANSION RECORD | |
| CHARGE INDEX = | (New Charge Index (CENTRAL REGION ONLY) |
| AMA Call Type = | MRTM (CENTRAL REGION ONLY) |
| MBI TYPE = | M (CENTRAL REGION ONLY) |
| 5202-5 FORM - MESSAGE REGISTER | |
| MBI = | 13 (CENTRAL REGION ONLY) |

To complete the configuration of a 5ESS switch to support a two way measured line, the SFG record assigned to the two way measured line must have an SFC field identifying the line as a two way measured line. With the exception of the SFC field, the contents of the SFG record for a two way measured line should be exactly the same as that for a regular INWATS line.

In the preferred embodiment, the SFC field of the SFG record assigned to two way measured lines of the 5ESS switch should be filled with "810".

DMS-100 Switches

To configure a Northern Telecom DMS-100 switch, the feature package NTXE43AA must be loaded to provide the terminating billing option. In addition, the Central Office will require a Line Class Code and Line Treatment Group to handle Local Measured Service ("LMS")
The DMS-100 requires an LMS Line to be configured with -continued

| Terminate Billing Option as follows: |
|---|
| >ADO |
| SONUMBER: |
| DN_OR_LEN: |
| OPTION: |
| >TBO |
| CALLCODE: |
| >(810 until Northern fix for Call Code 008) |
| SFPRSNT: |
| >Y |
| SFVAL: |
| >810 |
| OPTION: |
| >$ |

Configuring a telecommunication switch as described above results in a two way measured telecommunication line controlled by the switch. The switch configured in such a manner creates AMA records for both incoming and outgoing calls associated with the telecommunication line.

What is claimed is:

1. A method for measuring and billing usage of a wired telecommunication line associated with a subscriber, the line connecting a telecommunication switch and a subscriber device, the method comprising:

receiving a telecommunication call at the switch;

creating a service record for the call, wherein the service record has a call type code data field and a service feature code data field;

generating terminating call type data for the call if the call terminates at the switch from a telecommunication network;

storing the terminating call type data in the call type code data field of the service record for the call;

generating service feature code data for the call indicative of a measured service for the line;

storing the service feature code data in the service feature code data field of the service record for the call;

routing the call from the switch to the subscriber device via the line if the call terminates at the switch;

measuring, at the switch, a period of the call on the line based on the service feature code data; and generating a billing record based on the period of the call measured, the billing record including the service feature code data and the terminating call type data to distinguish the call from calls originating at the switch so that the subscriber pays for the line based on actual measured usage thereof irrespective of toll costs associated with routing the call to the switch from the telecommunication network.

2. The method of claim 1 further comprising:

generating originating call type data for the call if the call originates at the switch from the subscriber device;

storing the originating call type data in the call type code data field of the service record for the call;

routing the call from the subscriber device to the telecommunication network via the switch and the line if the call originates at the switch; and generating a billing record based on the period of the call measured, the billing record including the service feature code data and the originating call type data to distinguish the call from calls terminating at the switch so that the subscriber pays for the line based on actual measured usage thereof irrespective of toll costs associated with routing the call to the telecommunications network from the switch and the line is provided a two-way measured service.

3. The method of claim 1 wherein the switch is configured to forward a call that terminates at the switch to another wired telecommunication line.

4. The method of claim 1 wherein the subscriber device includes a voice messaging system.

5. The method of claim 1 wherein the switch is selected from the group consisting of a 1AESS analog telecommunication switch, a 5ESS digital telecommunication switch, and a DMS-100 telecommunication switch.

6. A system for measuring and billing usage of a wired telecommunication line associated with a subscriber, the system comprising:

a subscriber device;

a telecommunication switch connected to the subscriber device via the line;

means for receiving a telecommunication call at the switch;

control logic in the switch operative to create a service record for the call, wherein the service record has a call type code data field and a service feature code data field, generate terminating call type data for the call if the call terminates at the switch from a telecommunication network, generate service feature code data for the call indicative of a measured service for the line, route the call from the switch to the subscriber device via the line if the call terminates at the switch, and measure a period of the call on the line based on the service feature code data; and memory in the switch operative to store the terminating call type data in the call type data field of the service record for the call, and store the service feature code data in the service feature code data field of the service record for the call;

wherein the control logic is operative with the memory to generate a billing record based on the period of the call, the billing record including the service feature code data and the terminating call type data to distinguish the call from calls originating at the switch so that the subscriber pays for the line based on actual measured usage thereof irrespective of toll costs associated with routing the call to the switch from the telecommunication network.

7. The system of claim 6 wherein the control logic is further operative to generate originating call type data for the call if the call originates at the switch from the subscriber device, and route the call from the subscriber device to a telecommunication network via the switch and the line if the call originates at the switch;

wherein the memory is further operative to store the originating call type data in the call type code data field of the service record for the call;

wherein the control logic is further operative with the memory to generate a billing record based on the period of the call measured, the billing record including the service feature code data and the originating call type data to distinguish the call from calls terminating at the switch so that the subscriber pays for the line based on actual measured usage thereof irrespective of toll costs associated with routing the call to the telecommunications network from the switch and the line is provided a two-way measured service.

8. The system of claim 6 wherein the control logic is further operative to forward a call that terminates at the switch to another wired telecommunication line.

9. The system of claim 6 wherein the subscriber device includes a voice messaging system.

10. The system of claim 6 wherein the switch is selected from the group consisting of a 1AESS analog telecommunication switch, a 5ESS digital telecommunication switch, and a DMS-100 telecommunication switch.

* * * * *